United States Patent
Kang et al.

(10) Patent No.: US 12,434,636 B2
(45) Date of Patent: Oct. 7, 2025

(54) CONSOLE BOX FOR A VEHICLE

(71) Applicants: Hyundai Motor Company, Seoul (KR); Kia Corporation, Seoul (KR)

(72) Inventors: Shin Gyu Kang, Gyeonggi-do (KR); Keun Chul Lee, Gyeonggi-do (KR); Jae Yong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 522 days.

(21) Appl. No.: 17/960,654

(22) Filed: Oct. 5, 2022

(65) Prior Publication Data
US 2023/0158959 A1    May 25, 2023

(30) Foreign Application Priority Data
Nov. 22, 2021 (KR) .......................... 10-2021-0160955

(51) Int. Cl.
*B60R 7/04*   (2006.01)
*B60R 11/00*  (2006.01)

(52) U.S. Cl.
CPC ......... *B60R 7/04* (2013.01); *B60R 2011/0007* (2013.01); *B60R 2011/008* (2013.01); *B60R 2011/0084* (2013.01)

(58) Field of Classification Search
CPC .............. B60R 7/04; B60R 2011/0007; B60R 2011/0084; B60R 2011/0008; B60N 3/10; B60N 3/104; B60N 3/002; B60N 3/014; B60N 3/103; E06B 3/50; E05D 7/02; E05Y 2900/538
USPC ............. 296/24.34, 37.8; 297/188.14–17, 19
See application file for complete search history.

(56) References Cited

U.S. PATENT DOCUMENTS

| | | | | |
|---|---|---|---|---|
| 5,338,081 A | * | 8/1994 | Young | B60R 7/04 297/188.13 |
| 6,886,713 B1 | * | 5/2005 | Scherrer | B60R 11/06 220/817 |
| 7,806,451 B2 | * | 10/2010 | Lota | B60R 7/04 296/37.14 |
| 8,162,369 B2 | * | 4/2012 | Tsuda | B60N 2/773 296/24.34 |
| 9,981,589 B2 | * | 5/2018 | Senda | B60N 3/107 |

(Continued)

FOREIGN PATENT DOCUMENTS

CN    206465821 U  *  9/2017
KR    10-1999-0035666 A     5/1999

OTHER PUBLICATIONS

CN206465821 Text (Year: 2017).*

*Primary Examiner* — Dennis H Pedder
(74) *Attorney, Agent, or Firm* — Fox Rothschild LLP

(57) ABSTRACT

A console box for a vehicle includes a main body having a first accommodation space accessible through a first opening and a second accommodation space accessible through a second opening; a cover mounted on the main body and opening and closing the first opening; a detachable tray mounted on or detached from the first accommodation space through the first opening; and a sliding tray entering and exiting the second accommodation space through the second opening, opening and closing the second opening, and sliding in the second accommodation space, wherein the first accommodation space and the second accommodation space are communicated with each other in the main body.

18 Claims, 11 Drawing Sheets

(56) References Cited

U.S. PATENT DOCUMENTS

2009/0058120 A1* 3/2009 Ioka .................. B60R 7/04
296/24.35

* cited by examiner

CONSOLE BOX FOR A VEHICLE

CROSS-REFERENCE TO RELATED APPLICATION(S)

This application claims under 35 U.S.C. § 119(a) the benefit of Korean Patent Application No. 10-2021-0160955 filed on Nov. 22, 2021 in the Korean Intellectual Property Office, the disclosure of which is incorporated herein by reference in its entirety.

TECHNICAL FIELD

Embodiments of the present disclosure relate to a console box for a vehicle which may be accessed in multiple directions and to which various functions may be added, thereby increasing user convenience.

DESCRIPTION OF RELATED ART

In general, a simplified floor console box installed on a floor panel between separator seats has been used in a vehicle. Such a floor console box has been widely used for storing items of passengers.

The console box may include a box-type body installed on the upper surface of a floor panel forming the floor of the interior space of vehicle and forming a storage space for storing items, and a cover mounted on the upper end of the body by a hinge and opening and closing the storage space. The cover may be used as an arm rest for convenience of a passenger.

In the console box having such a structure, only the passenger in the first row seat located on both sides of the console box may open and close the cover without inconvenience. Accordingly, for example, in order for the passenger in the second row seat (a back seat) located behind the console box to open the cover of the console box and to take out or store items, the passenger should adopt an uncomfortable posture or should move, such that the number of users of the console box may be limited.

To address the above issue, an upper tray and a lower tray may be independently disposed to be blocked from each other in the console box, the cover may be combined to the upper tray side and the lower tray may be configured in the form of a drawer, such that the lower tray may be open to slide to the rear side of the console box.

However, in the console box having this structure, it may be difficult for the passenger of the first row seat to use the lower tray, and it may still be difficult for the passenger of the second row seat to access the upper tray through the cover. Moreover, when the second row seat is closely adhered to the first row seat, the lower tray may be blocked by the seat or may be interfered with the seat when opened, such that it may be difficult to use the lower tray. Also, additional functions other than the storage of items may be necessary.

SUMMARY

An aspect of the present disclosure is to provide a console box for a vehicle which may be accessed in multiple directions and to which various functions may be added, thereby increasing user convenience.

According to an aspect of the present disclosure, a console box for a vehicle includes a main body having a first accommodation space accessible through a first opening and a second accommodation space accessible through a second opening; a cover mounted on the main body and opening and closing the first opening; a detachable tray mounted on or detached from the first accommodation space through the first opening; and a sliding tray entering and exiting the second accommodation space through the second opening, opening and closing the second opening, and sliding in the second accommodation space, wherein the first accommodation space and the second accommodation space are communicated with each other in the main body.

The cover may include a frame rotatably installed around the first opening of the main body through a first hinge and having a hollow portion; and a hood mounted on the frame and opening and closing the hollow portion.

The hood may be rotatably installed on the frame through a second hinge, and the second hinge may be disposed on an opposite side of the first hinge in the frame.

A guide groove may be formed in the frame, and a protrusion may be formed in the hood and move while being inserted into the guide groove of the frame, such that the hood slides around the hollow portion in the frame.

The first accommodation space and the second accommodation space are disposed in a vertical direction in the main body, and the first opening may be formed in an upper surface of the main body, and the second opening may be formed in a lower rear surface of the main body.

The first accommodation space may be formed by a plurality of upper sidewalls, at least one of the upper sidewalls may be inclined such that a distance from the other upper sidewall opposite thereto decreases downwardly, and at least one of the side surfaces of the detachable tray may be inclined to correspond to the inclined upper sidewall of the first accommodation space.

A stepped portion may be formed on an upper end of the upper sidewall, a locking groove extending outwardly may be formed on an upper end of a side surface of the detachable tray, and the locking groove may be formed to shape-fit the stepped portion.

The second accommodation space may be formed by a plurality of lower sidewalls and a bottom surface, a rail member may be installed on an internal surface of the second accommodation space, and a slider or a rolling member may be installed in the sliding tray and move along the rail member.

A length of the sliding tray extending in a front-rear direction of the vehicle may be at least twice greater than a length of a lower cross-section of the first accommodation space extending in a front-rear direction of the vehicle, and a stopper may be installed in the sliding tray such that, when the sliding tray may be moved out of the second accommodation space for opening, and a side surface of the sliding tray directed to a front side of a vehicle reaches an upper sidewall of the first accommodation space directed to a front side of the vehicle, a sliding movement of the sliding tray may be stopped.

The console box for a vehicle may further include a blocking member having a plate shape, connected to the sliding tray, interlocked with the movement of the sliding tray, and blocking a space between the first accommodation space and the second accommodation space in the main body.

The blocking member may be movable into a space between a lower sidewall forming the second accommodation space and an external wall of the main body, and an insertion groove may be formed in a sidewall of the main body, support the blocking member and induce a movement thereof.

A stopper may be installed in the sliding tray such that, when the sliding tray may be moved out of the second accommodation space for opening, and a side surface of the sliding tray directed to a front side of a vehicle reaches an upper sidewall of the first accommodation space directed to a rear side of the vehicle, a sliding movement of the sliding tray may be stopped.

The console box for a vehicle may further include an air flow path formed between an external wall of the main body and an upper sidewall forming the first accommodation space and supplying external air to the first accommodation space.

The air flow path may include a first grill formed on an external wall of the main body; a second grill formed on an upper sidewall of the first accommodation space; and a duct connecting the first grill to the second grill.

The detachable tray may be replaceable with one of a tray to which a ventilation unit may be applied, a tray to which a drying unit may be applied, and a tray to which a cooling and warming storage unit may be applied.

The tray to which a ventilation unit may be applied may include a ventilation grill formed to correspond to the second grill on at least one of side surfaces of the tray; and a circulation grill formed on at least a portion of a bottom surface of the tray.

The tray to which a drying unit may be applied may include a ventilation grill formed to correspond to the second grill on at least one of side surfaces of the tray; and a circulation grill formed on at least a portion of a bottom surface of the tray, and the drying unit may include a heater for heating air flowing into the tray, and a blowing fan for blowing the heated air through the circulation grill.

The tray to which a cooling and warming storage unit may be applied may include a ventilation grill formed to correspond to the second grill on at least one of the side surfaces of the tray; and a circulation grill formed on at least a portion of a bottom surface of the tray, and the cooling and warming storage unit may include a thermoelectric module for absorbing heat on one side surface and emitting heat on the other side surface when power may be supplied; and a pair of blowing fans installed on both sides of the thermoelectric module and blowing air heat-exchanged with the thermoelectric module.

The detachable tray or the sliding tray may include an ultraviolet lamp generating ultraviolet rays.

As discussed, the method and system suitably include use of a controller or processer.

In another embodiment, vehicles are provided that comprise an apparatus as disclosed herein.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
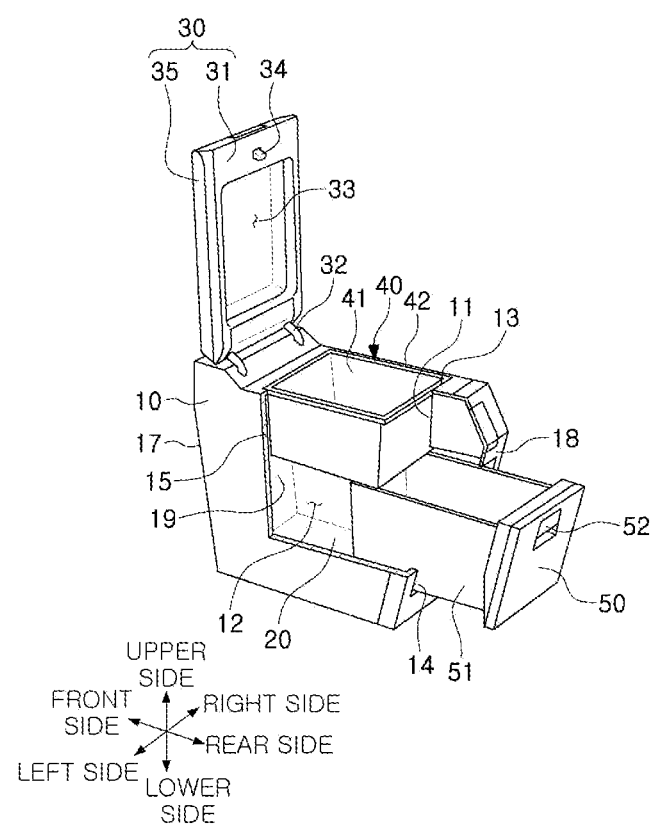
FIG. 1 is a perspective diagram illustrating a console box for a vehicle according to a first embodiment of the present disclosure, partially cut away.

Hereinafter, embodiments of the present disclosure will be described as follows with reference to the attached drawings.

The elements having the same function within the scope of the same concept represented in the drawing of each embodiment will be described using the same reference numeral.

In the embodiments, a vehicle refers to various vehicles moving an object such as a person, an animal, or an item from one place to a destination. Such vehicles are not limited to vehicles traveling on roads or tracks.

Also, the terms "upper," "lower," "up and down," "left and right," "front and rear," "front," "rear," "side," used in indicating directions are defined based on a vehicle or a vehicle body, that is, an object on which an object is installed.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
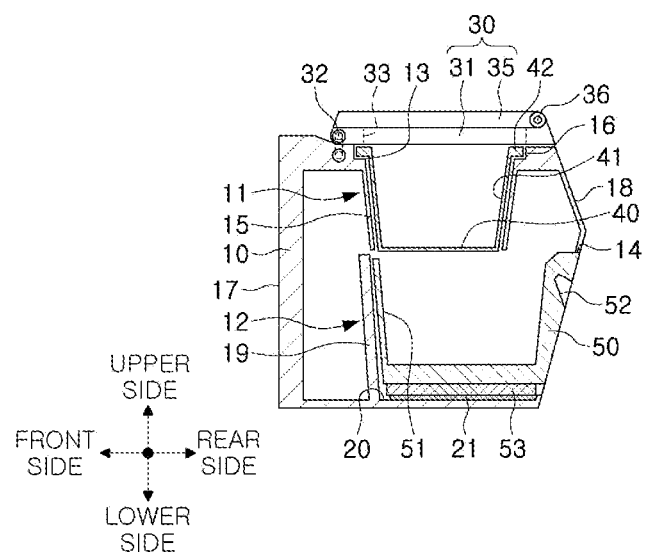
FIG. 2 is a cross-sectional diagram illustrating a console box for a vehicle according to a first embodiment of the present disclosure.

FIG. 1 is a perspective diagram illustrating a console box for a vehicle according to a first embodiment, partially cut away. FIG. 2 is a cross-sectional diagram illustrating a console box for a vehicle according to a first embodiment.

The console box for a vehicle in the first embodiment may include a main body 10, a cover 30, a detachable tray 40 and a sliding tray 50.

The main body 10 may be formed in a substantially hexahedral box shape. The main body may be fixed to the upper surface of the floor panel 3 (see FIGS. 13 and 14) forming the floor of the internal space of a vehicle between the separate seats of the vehicle.

Here, both seats adjacent to the side of the main body 10 by the shortest distance may be referred to as a first row seat 1 (see FIGS. 13 and 14). Also, a seat (rear seat) or a seat row disposed on the rear side of the main body may be referred to as a second row seat 2 (see FIGS. 13 and 14).

However, the shape and arrangement of the main body is not necessarily limited thereto.

The main body 10 may have a first accommodation space 11 and a second accommodation space 12 therein. For example, the first accommodation space and the second accommodation space may be disposed in a vertical direction within the main body. Also, the upper first accommodation space may have a volume smaller than that of the lower second accommodation space.

The first accommodation space 11 and the second accommodation space 12 may communicate with each other and may be integrated with each other as a single space. Also, the first accommodation space may include a first opening 13 for being communicated with the outside of the main body 10 and may be accessible through the first opening. The second accommodation space may include a second opening 14 for being communicated with the outside of the main body and may be accessible through the second opening.

For example, the first opening 13 may be formed on the upper surface of the main body 10, and the second opening 14 may be formed on one side surface of the lower portion of the main body 10, preferably on the lower rear surface of the main body 10.

Accordingly, an item may be accommodated in or taken out from at least one of the first accommodation space 11 and the second accommodation space 12 in the main body 10 through at least one of the first opening 13 of the upper surface or the second opening 14 of the lower rear surface.

The first accommodation space 11 may be formed by upper sidewalls 15. At least one of the upper sidewalls may be slightly inclined such that the distance from the other upper sidewall opposite thereto may decrease downwardly. Also, a stepped portion 16 may be formed at the upper end of the upper sidewall. Due to the inclined upper sidewall and the stepped portion of the upper end, the detachable tray 40 may be seated in place in the first accommodation space 11.

The main body 10 may further include a front external wall 17 and a rear external wall 18 spaced apart from the upper sidewalls 15 forming the first accommodation space 11 by a predetermined distance.

The second accommodation space 12 may be formed by the lower sidewalls 19 and the bottom surface 20. A rail member 21 extending in the front-rear direction of the vehicle may be installed on the bottom surface. As the second opening 14 is formed in the lower sidewall directed to the rear side of the vehicle among the lower sidewalls, the sliding tray 50 may slide in the front-rear direction of the vehicle in the second accommodation space and may enter the second accommodation space or may be moved from the second accommodation space.

The front external wall 17 of the main body 10 may be spaced apart from the lower sidewall directed to the front side of the vehicle among the lower sidewalls 19 forming the second accommodation space 12 by a predetermined distance.

Here, the arrangement relationship of the rail member is not necessarily limited to the above-described example. For example, the rail member 21 may be disposed on the internal surface of the lower sidewall directed to the side of the vehicle among the lower sidewalls 19 of the second accommodation space 12.

The cover 30 may include a frame 31 rotatably installed around the first opening 13 of the main body 10 via the first hinge 32 and having a hollow portion 33, and a hood 35 mounted on the frame and opening and closing the hollow portion.

This cover 30 may have a shape and size for closing the first opening 13 of the main body 10. Also, the cover may be used as an arm rest for convenience of the passenger.

One side of the frame 31 may be connected to one side of the upper surface of the main body by the first hinge 32. FIGS. 1 and 2 illustrate an example in which the first hinge is installed on the front side of the vehicle around the first opening 13 of the main body 10, but the position of the first hinge is not necessarily limited thereto. For example, the first hinge may be installed on the rear side of the vehicle around the first opening of the main body, or may even be installed on either side of the vehicle in the left and right direction.

Optionally, a latch 34 may be formed on the opposite side of the first hinge 32 on the bottom surface of the frame 31, and a locking groove 22 (see FIG. 3B) may be formed on the opposite side of the first hinge on the upper surface of the main body 10.

In the console box for a vehicle in the first embodiment, the hood 35 may be rotatably installed on the frame 31 via the second hinge 36. One side of the hood may be connected to one side of the upper surface of the frame by a second hinge.

The second hinge 36 may be installed on the opposite side of the first hinge 32 in the frame 31, examples of which are illustrated in FIGS. 1 and 2. However, the position of the second hinge is not necessarily limited to the illustrated example.

Figure 3A:
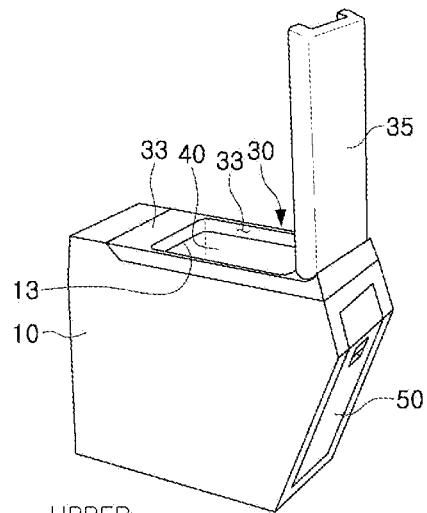
FIGS. 3A and 3B are diagrams for explaining an operation of a cover of a console box for a vehicle according to a first embodiment of the present disclosure.
Figure 3B:
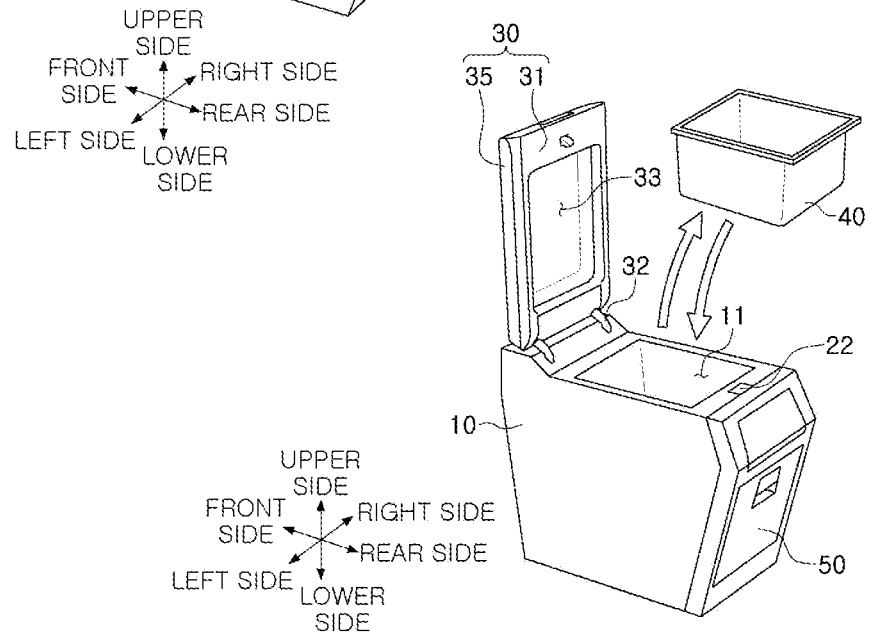

FIGS. 3A and 3B are diagrams for explaining an operation of a cover of a console box for a vehicle according to a first embodiment.

For example, in order for a passenger of the first row seat 1 to access the first accommodation space 11 of the main body 10, a hood 35 of the cover 30 may be open as illustrated in FIG. 3A. Specifically, when the passenger lifts the other side of the hood by hand, the hood may rotate about the second hinge 36. The hollow portion 33 of the frame 31 and the first opening 13 of the main body may be opened depending on rotation of the hood.

Accordingly, the passenger of the first row seat 1 may conveniently access the first accommodation space 11 of the main body through the hollow portion 33 of the frame 31 and the first opening 13 of the main body 10, and the item may be accommodated in or taken out from the detachable tray 40 accommodated in the first accommodation space.

For example, in order for the passenger of the second row seat 2 to access the first accommodation space 11 of the main body 10, the frame 31 of the cover 30 in the embodiment as illustrated in FIG. 3B may be open. Specifically, when the passenger lifts the other side of the frame, that is, the second hinge 36 side of the hood 35 by hand, the frame may rotate about the first hinge 32 together with the hood.

Accordingly, the passenger of the second row seat 2 may conveniently access the first accommodation space 11 of the main body 10 through the first opening 13 of the main body 10 without taking an uncomfortable posture, and may store an item in or take out an item from the detachable tray 40 accommodated in the first accommodation space.

As described above, using the cover of the console box for a vehicle in the first embodiment, the passenger may conveniently access the first accommodation space of the main body in various directions regardless of the seat row, which may be advantageous.

Referring back to FIGS. 1 and 2, the detachable tray 40 may be mounted on or detachably coupled to the first accommodation space 11 of the main body 10 through the first opening 13. The detachable tray may have a storage space therein and may store various items. To this end, the detachable tray may be formed in a box form with an open upper surface.

At least one of the side surfaces 41 of the detachable tray 40 may correspond to at least one of the upper sidewalls 15 of the first accommodation space 11, that is, may be formed to be slightly inclined such that the distance from the other side surface opposite thereof may decrease downwardly.

Also, a hook portion 42 extending outwardly may be formed in the upper end of the side surface of the detachable tray 40. The hook portion may be formed to shape-fit the stepped portion 16 at the upper end of the upper sidewall 15 of the first accommodation space 11.

Accordingly, when the detachable tray 40 is mounted on the first accommodation space 11 of the main body 10, the detachable tray may be seated in place in the first accommodation space. Also, the detachable tray may be mounted reliably by the hook portion 42 in a simplified manner, and the shaking of the detachable tray in the first accommodation space may be prevented as the hook portion 42 and the stepped portion 16 are shape-fitted to each other.

In the console box for a vehicle in the first embodiment, since the detachable tray 40 is not integrated with the main body 10, but may be detachable therefrom, the detachable tray 40 may be easily detachable depending on the needs of the passenger and may be selectively used.

The detachable tray 40 may work as an internal cover for partially closing the open upper surface of the sliding tray when the sliding tray 50 is accommodated in the second accommodation space 12 in the main body 10.

The sliding tray 50 may be coupled to the second accommodation space 12 of the main body 10 to be able to enter or move out of the second accommodation space 12 through the second opening 14. The sliding tray may have a storage space therein and may store various items. To this end, the sliding tray may be formed in a box shape with an open upper surface.

Among the side surfaces 51 of the sliding tray 50, the rear side surface directed to the rear side in the front-rear direction of the vehicle, for example, may have a shape corresponding to the shape of the second opening 14 formed in the lower rear surface of the main body 10, such that, when the sliding tray completely enters the second accommodation space, the rear side surface may align with the rear surface of the main body and may be shape-fitted with the second opening simultaneously, thereby closing the second opening.

Also, the handle 52 may be formed or mounted on the rear side surface of the sliding tray 50. The passenger may hold the handle and transmit force and may allow the sliding tray to slide in the second accommodation space 12 of the main body 10, and may allow the sliding tray to enter the second accommodation space or to be moved out of the second accommodation space.

A slider 53 or a rolling member movable along the rail member 21 installed on the internal surface of the second accommodation space 12 may be installed in the sliding tray

50. Accordingly, the sliding tray may slide smoothly in the front-rear direction of the vehicle along the rail member.

As such, the passenger may access the console box for a vehicle in the first embodiment in various directions and may conveniently use all the trays disposed therein.

Figure 4:
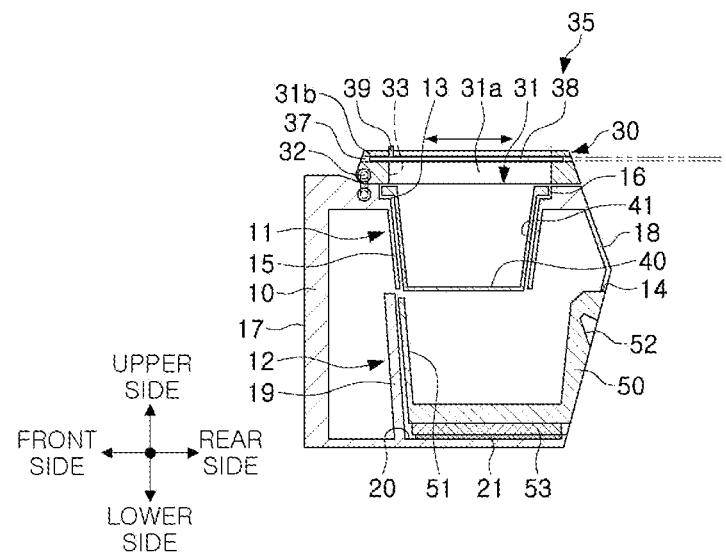
FIG. 4 is a cross-sectional diagram illustrating a console box for a vehicle according to a second embodiment of the present disclosure.

FIG. 4 is a cross-sectional diagram illustrating a console box for a vehicle according to a second embodiment.

Referring to FIG. 4, the console box for a vehicle in the second embodiment may include a main body 10, a cover 30, a detachable tray 40 and a sliding tray 50.

In the second embodiment illustrated in FIG. 4, only the configuration of the cover 30 may be different, and the other components may be the same as those of the first embodiment illustrated in FIGS. 1 to 3. Accordingly, in describing the console box for a vehicle in the second embodiment, the same reference numerals may be given to the same components as those of the console box for a vehicle in the first embodiment, and detailed descriptions of the configuration and functions thereof will not be provided.

The cover 30 may include a frame 31 rotatably installed around the first opening 13 of the main body 10 via a first hinge 32 and having a hollow portion 33, and a hood 35 mounted on the frame and opening and closing the hollow portion.

This cover 30 may have a shape and size for closing the first opening 13 of the main body 10. Also, the cover may be used as an arm rest for convenience of the passenger.

One side of the frame 31 may be connected to one side of the upper surface of the main body 10 by a first hinge 32. FIGS. 1 and 2 illustrate an example in which the first hinge is installed on the front side of the vehicle around the first opening 13 of the main body, but the position of the first hinge is not necessarily limited thereto. For example, the first hinge may be installed on the rear side of the vehicle around the first opening of the main body, or may even be installed on either side of the vehicle in the left and right direction.

Also, guide groove 37 may be formed in a predetermined length on the internal surface of the first frame member 31*a* of the frame 31 on both sides, extending in the front-rear direction, that is, the surface opposing the hollow portion 33, in the front-rear direction of the vehicle.

For example, the guide groove 37 may pass through the second frame member 31*b* of the frame 31 on the rear side, extending in the left and right direction of the vehicle, and may penetrate the end surface on the rear side of the first frame member 31*a* on both sides. In other words, one end (e.g., the rear end) of both ends in the length direction of the guide groove may be open and the other end (e.g., the front end) may be closed.

In this case, the closed end of the guide groove 37 may be preferably disposed on the side adjacent to the first hinge 32 in the frame 31. An example thereof is illustrated in FIG. 4.

However, the arrangement of the guide grooves 37 is not necessarily limited to the illustrated example, and for example, the guide grooves may be formed on the upper surfaces of the first frame members 31*a* on both sides. Also, the positions of the closed end and the open end may be reversed, or both ends may be formed as open ends without a closed end.

In the console box for a vehicle in the second embodiment, the hood 35 may include a protrusion 38 having an almost fin-shape and inserted into the guide groove 37 of the frame 31, and the protrusion may be movable within the guide groove, such that the hood may slide around the hollow portion 33 of the frame.

The protrusion 38 of the hood 35 may be both edges of the hood, may be formed to protrude outwardly along both edges of the hood, or may be formed to be adjacent to both edges and to protrude to a region below the hood. This protrusion may be inserted into the guide groove 37 in the first frame member 31*a* and may move in the guide groove in the front-rear direction of the vehicle along the guide groove.

Also, a stopper 39 may be formed adjacent to one end in the length direction of the protrusion between the both protrusions 38 on the upper or lower surface of the hood 35. The stopper may be formed to protrude upwardly from the upper surface of the hood or to protrude downwardly from the bottom surface of the hood. When the stopper of the hood is in contact with the second frame member 31*b* of the frame 31, movement of the hood may be prevented and the hood may be prevented from being separated from the frame.

In order for the passenger to access the first accommodation space 11 of the main body 10, the hood 35 of the cover 30 in the embodiment may be opened. Specifically, as the passenger pushes the hood in one of the front and rear directions of the vehicle by hand, the hood may slide between the first frame members 31*a* on both sides of the frame 31. As the hood moves, the hollow portion 33 of the frame and the first opening 13 of the main body may be opened.

Accordingly, the passenger may conveniently access the first accommodation space 11 of the main body through the hollow portion 33 of the frame and the first opening 13 of the main body 10 without opening the frame 31, and may store an item in or may take out an item from the detachable tray 40 accommodated in the first accommodation space.

For example, the passenger of the second row seat 2 may open the frame 31 of the cover 30 to access the first accommodation space 11 of the main body 10.

Accordingly, the passenger of the second row seat 2 may conveniently access the first accommodation space 11 of the main body 10 through the first opening 13 of the main body 10 without taking an uncomfortable posture, and may store an item in or may take out an item from the detachable tray 40 accommodated in the first accommodation space.

As described above, using the cover of the console box for a vehicle in the second embodiment, the passenger may conveniently access the first accommodation space of the main body in various directions regardless of the seat row, which may be advantageous.

Figure 5:
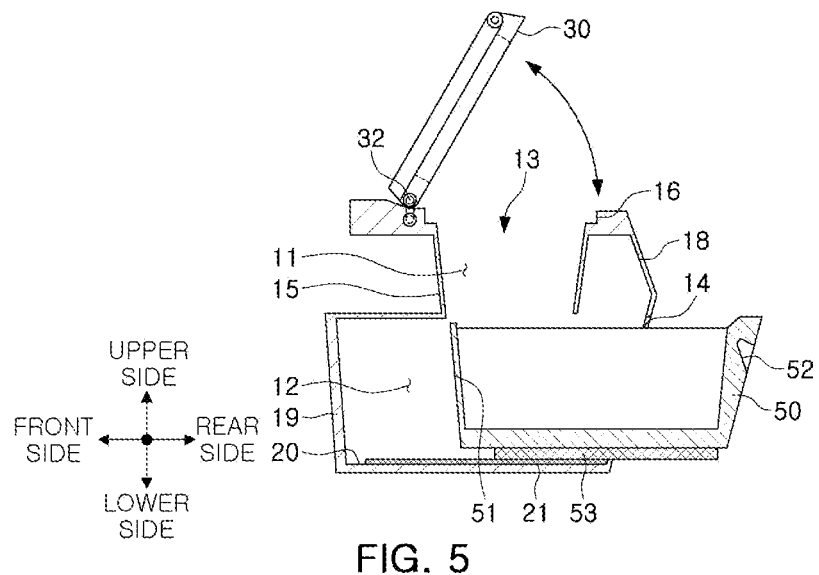
FIG. 5 is a cross-sectional diagram illustrating a console box for a vehicle according to a third embodiment of the present disclosure.

FIG. 5 is a cross-sectional diagram illustrating a console box for a vehicle according to a third embodiment.

Referring to FIG. 5, the console box for a vehicle in the third embodiment may include a main body 10, a cover 30, a detachable tray 40 and a sliding tray 50.

Only the configuration of the second accommodation space 12 and the sliding tray 50 of the main body 10 in the third embodiment illustrated in FIG. 5 may be different, and the other components may be the same as those of the first embodiment or the second embodiment illustrated in FIGS. 1 to 4. Accordingly, in describing the console box for a vehicle in the third embodiment, the same reference numerals may be given to the same components as those of the console box for a vehicle according to the first and second embodiments described above, and detailed descriptions of the configuration and function thereof will not be provided.

The main body 10 may be formed in a stepped box shape, and a first accommodation space 11 and a second accommodation space 12 may be formed therein. For example, the first accommodation space and the second accommodation space may be disposed in the vertical direction within the main body. Also, the upper first accommodation space may have a volume smaller than that of the lower second accommodation space.

The first accommodation space 11 and the second accommodation space 12 may communicate with each other and may be integrated with each other as a single space. For example, an item may be accommodated in or taken out from at least one of the first and second accommodation spaces in the main body 10 through at least one of the first opening 13 on the upper surface and the second opening 14 on the lower rear surface.

The second accommodation space 12 may be formed by the lower sidewalls 19 and the bottom surface 20. A rail member 21 extending in the front-rear direction of the vehicle may be installed on the bottom surface. As the second opening 14 is formed in the lower sidewall directed to the rear side of the vehicle among the lower sidewalls, the sliding tray 50 may slide in the front-rear direction of the vehicle in the second accommodation space and may enter the second accommodation space or may be moved out of the second accommodation space.

Here, the arrangement of the rail member 21 is not necessarily limited to the above-described example. For example, the rail member may be disposed on the internal surface of the lower sidewall of the second accommodation space 12 directed to the side of the vehicle among the lower sidewalls 19.

The lower sidewall among the lower sidewalls 19 of the second accommodation space 12, directed to the front side of the vehicle, may be positioned forwardly away from the upper sidewall among the upper sidewalls 15 of the first accommodation space 11, directed to the front side of the vehicle. Accordingly, the lengths of the lower sidewalls and the bottom surface directed to the side of the vehicle, extending in the front-rear direction of the vehicle, may further increase than the length of the lower sidewalls and the bottom surface forming the second accommodation space, extending in the front-rear direction of the vehicle, in the first or second embodiment.

Due to this configuration, the main body 10 may be formed in a shape in which the lower portion thereof may protrude further toward the front side of the vehicle than the upper portion.

The sliding tray 50 may be coupled to the second accommodation space 12 of the main body 10 to enter and to be moved out of the second accommodation space 12 through the second opening 14. The sliding tray may be formed in an open box shape.

A slider 53 or a rolling member movable along the rail member 21 installed on the internal surface of the second accommodation space 12 may be installed on the sliding tray 50. Accordingly, the sliding tray may slide smoothly in the front-rear direction of the vehicle along the rail member.

The sliding tray 50 in the console box for a vehicle in the third embodiment may have a length extending in the front-rear direction of the vehicle, which may be further increased than that of the sliding tray in the first or second embodiment by an increased length extending in the front-rear direction of the vehicle, to correspond to the size of the second accommodation space 12 in the main body 10.

For example, the length extending in the front-rear direction of the vehicle of the sliding tray 50 may be at least twice as long as the length extending in the front-rear direction of the vehicle, which may be a length of the lower cross-section of the first accommodation space 11.

In this case, a stopper, not illustrated, may be installed on the rail member 21 or the sliding tray such that, when the sliding tray 50 moves out of the second accommodation space 12 for opening, and the side surface directed to the front side of the vehicle among the side surfaces 51 of the sliding tray reaches the upper sidewall 15 directed to the front side of the vehicle of the first accommodation space 11, the sliding movement of the sliding tray is stopped.

Accordingly, in the console box for a vehicle in the third embodiment, when the sliding tray 50 is opened simultaneously as the cover 30 opened in a state in which the detachable tray 40 is separated, due to the extended size of the second accommodation space 12 and the sliding tray, it may be possible to prevent the item or the hand of the passenger from entering the area of the second accommodation space in which no sliding tray is disposed. In other words, the item entering the second accommodation space 12 through the first opening 13 and the first accommodation space 11 may always be stored in the sliding tray.

As such, the console box for a vehicle in the third embodiment may prevent in advance the loss or damage of items, injury to the passenger, or the like, when the sliding tray is opened simultaneously as the cover opens.

Figure 6:
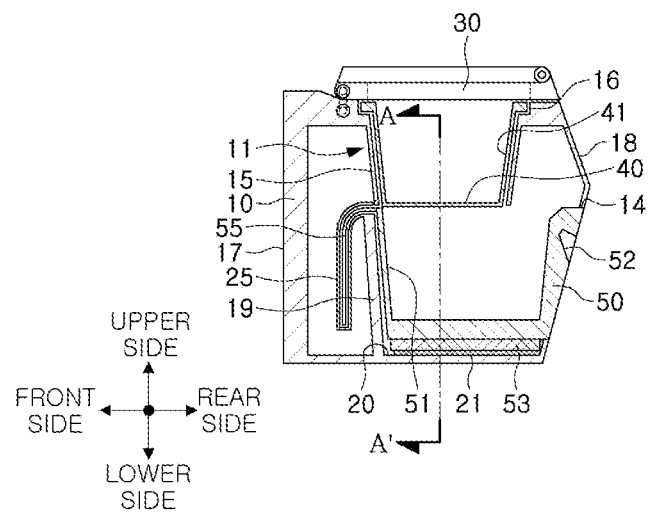
FIG. 6 is a cross-sectional diagram illustrating a console box for a vehicle according to a fourth embodiment of the present disclosure.
Figure 7:
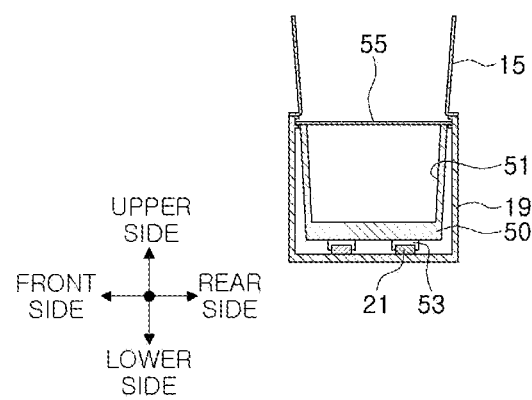
FIG. 7 is a cross-sectional diagram taken along line A-A' in FIG. 6.
Figure 8:
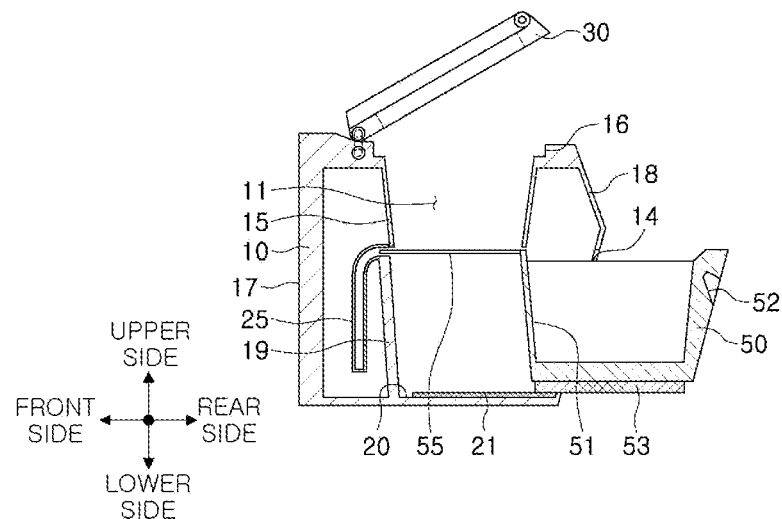
FIG. 8 is a diagram illustrating an operation state of a console box for a vehicle according to a fourth embodiment of the present disclosure.

FIG. 6 is a cross-sectional diagram illustrating a console box for a vehicle according to a fourth embodiment. FIG. 7 is a cross-sectional diagram taken along line A-A' in FIG. 6. FIG. 8 is a diagram illustrating an operation state of a console box for a vehicle according to a fourth embodiment.

Referring to FIGS. 6 to 8, the console box for a vehicle in the fourth embodiment may include a main body 10, a cover 30, a detachable tray 40, a sliding tray 50 and a blocking member 55.

Only the configuration of the fourth embodiment illustrated in FIGS. 6 to 8 in which blocking member 55 is added may be different, and the other components may be the same as those of the first embodiment or the second embodiment illustrated in FIGS. 1 to 4. Accordingly, in describing the console box for a vehicle in the fourth embodiment, the same reference numerals may be given to the same components as those of the console box for a vehicle according to the first and second embodiments described above, and detailed descriptions of the configuration and function thereof will not be provided.

The console box for a vehicle in the fourth embodiment may further include a blocking member 55 connected to the sliding tray 50, interlocked with the movement of the sliding tray, and blocking the space between the first accommodation space 11 and the second accommodation space 12 in the main body 10.

The blocking member 55 may be a flexible member having a plate shape, and may be formed of a material such as plastic or metal having high ductility. The blocking member may have an area having the same size as that of the lower cross-section of at least the first accommodation space 11.

One end of the blocking member 55 may be connected to one of the side surfaces 51 of the sliding tray 50, that is, for example, a side surface directed to the front side in the front-rear direction of the vehicle. The blocking member may penetrate the lower sidewall directed to the front side of the vehicle among the lower sidewalls 19 of the second accommodation space 12 or may be disposed over the upper end and may move to the space between the lower sidewall and the front external wall 17 of the main body 10.

To support the extension of the blocking member 55 and to induce movement, an insertion groove 25 may be formed in the both lower sidewalls directed to the side of the vehicle among the lower sidewalls 19 of the second accommodation space 12, that is, the sidewall of the main body 10. FIGS. 6 and 8 illustrate an example in which, after the insertion groove is curved, the insertion groove may extend linearly toward the front side. However, the shape of the insertion groove is not necessarily limited thereto.

In the console box for a vehicle in the fourth embodiment, as the sliding tray 50 is moved out of the second accommodation space 12 of the main body 10, the blocking member 55 connected to the sliding tray may be drawn out from the lower sidewall 19 directed to the front side of the vehicle of the second accommodation space such that the blocking member 55 may block the space between the first accommodation space 11 and the second accommodation space 12 in the main body.

In this case, a stopper, not illustrated, may be installed on the rail member 21 or the sliding tray such that, when the sliding tray 50 is moved out of the second accommodation space 12 for opening, and the side surface directed to the front side of the vehicle among the side surfaces 51 of the sliding tray reaches the upper sidewall 15 of the first accommodation space 11, directed to the rear side of the vehicle, the sliding movement of the sliding tray may be stopped.

Accordingly, in the console box for a vehicle in the fourth embodiment, when the sliding tray 50 is opened simultaneously as the cover 30 opens in a state in which the detachable tray 40 is separated, by the blocking member 55, it may be possible to prevent an item or the hand of the passenger from entering the area of the second accommodation space 12 in which no sliding tray is disposed. When the sliding tray is not opened in a state in which the cover is opened and the detachable tray is separated, or when the sliding tray is opened regardless of the opening and closing of the cover, the item may be stored in the second accommodation space.

As such, when the sliding tray is opened simultaneously as the cover opens, the console box for a vehicle in the fourth embodiment may prevent loss or damage of items, injury to the passenger, or the like, in advance.

Figure 9:
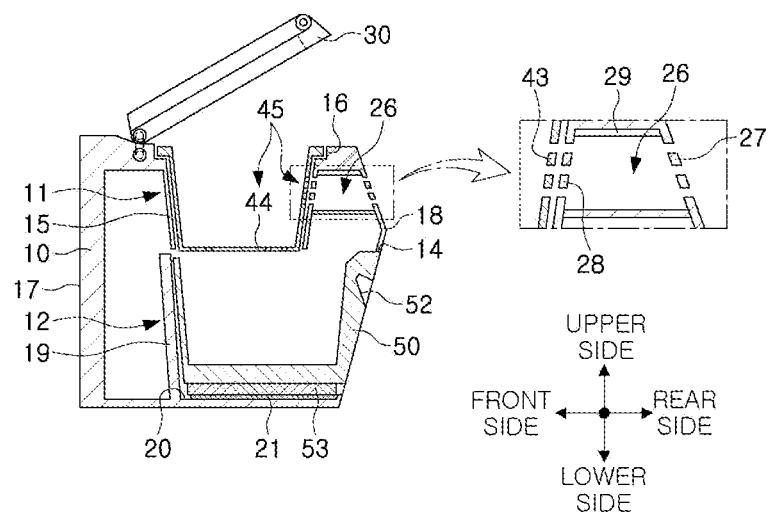
FIG. 9 is a cross-sectional diagram illustrating a console box for a vehicle according to a fifth embodiment of the present disclosure.

FIG. 9 is a cross-sectional diagram illustrating a console box for a vehicle according to a fifth embodiment.

Referring to FIG. 9, the console box for a vehicle in the fifth embodiment may include a main body 10, a cover 30, a detachable tray 40, a sliding tray 50, an air flow path 26 and a ventilation unit 45.

The configuration in the fifth embodiment illustrated in FIG. 9 in which the air flow path 26 and the ventilation unit 45 for the accommodation space of the main body 10 are added may be different, and the other components may be the same as those of the first to fourth embodiments illustrated in FIGS. 1 to 8. Accordingly, in describing the console box for a vehicle in the fifth embodiment, the same reference numerals may be given to the same components as those of the console box for a vehicle according to the first to fourth embodiments described above and detailed descriptions of the configuration and functions will not be provided.

The console box for a vehicle in the fifth embodiment may further include an air flow path 26 formed between the external walls 17 and 18 of the main body 10 and the upper sidewall 15 forming the first accommodation space 11 and supplying external air to the first accommodation space.

The air flow path 26 may include a first grill 27 formed on the external walls 17 and 18 of the main body 10, a second grill 28 formed on the upper sidewall 15 of the first accommodation space 11, and a duct 29 connecting the first grill to the second grill.

FIG. 9 illustrates an example in which the air flow path 26 is disposed on the rear side of the main body 10, but an exemplary embodiment thereof is not limited thereto, and the air flow path 26 may be disposed on the front side of the main body, for example.

Also, the detachable tray 40 may include a ventilation grill 43 formed to correspond to the second grill 28 on at least one of the side surfaces 41. Accordingly, external air outside the main body 10 may pass through the air flow path 26 and may flow into the main body, in particular, into the first accommodation space 11 and the detachable tray 40.

Optionally, the detachable tray 40 may include a circulation grill 44 formed on at least a portion of the bottom surface. In this case, the ventilation grill 43 and the circulation grill 44 of the detachable tray may work as the ventilation unit 45.

Since the first accommodation space 11 and the second accommodation space 12 are communicate with each other, the external air may flow into the second accommodation space, and accordingly, the external air outside the main body 10 may pass through the air flow path 26 and the first accommodation space or the detachable tray 40 and may also flow into the sliding tray 50 of the second accommodation space.

As described above, the console box for a vehicle in the fifth embodiment may implement a ventilation function when ventilation, heat exchange, or the like are required for the items stored in the main body, thereby expanding functionality of the console box.

Figure 10:
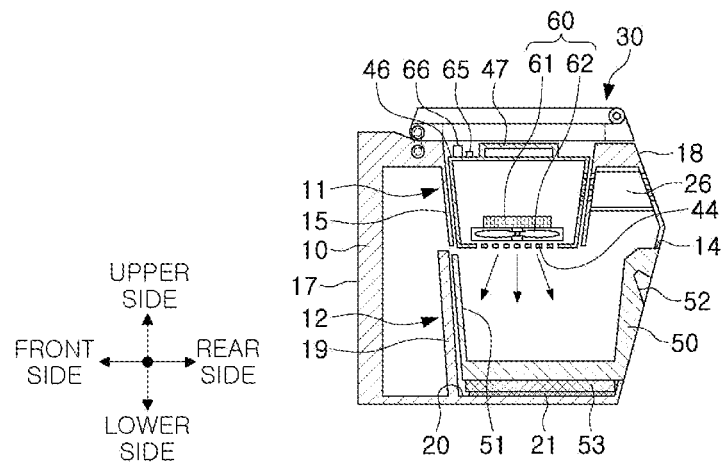
FIG. 10 is a cross-sectional diagram illustrating a console box for a vehicle according to a sixth embodiment of the present disclosure.

FIG. 10 is a cross-sectional diagram illustrating a console box for a vehicle according to a sixth embodiment.

Referring to FIG. 10, the console box for a vehicle in the sixth embodiment may include a main body 10, a cover 30, a detachable tray 40, a sliding tray 50, an air flow path 26 and a drying unit 60.

The configuration of the sixth embodiment illustrated in FIG. 10 in which the drying unit 60 is added may be different, and the other components may be the same as those of the fifth embodiment illustrated in FIG. 9. Accordingly, in describing the console box for a vehicle in the sixth embodiment, the same reference numerals may be given to the same components as those of the console box for a vehicle according to the fifth embodiment, and detailed descriptions of the configuration and functions will not be provided.

In the console box for a vehicle in the sixth embodiment, the drying unit 60 may be installed in the detachable tray 40. The drying unit may include a heater 61 for heating the air flowing into the detachable tray, and a blowing fan 62 for blowing the heated air through the circulation grill 44.

As the heater 61, a heater that generates heat by using electricity as an energy source may be employed. The blowing fan 62 may include a motor (not illustrated) and may be driven by the motor. The power of the heaters and the blower fan may be applied while being electrically connected to the vehicle's battery, and to this end, a cable, a connector having a contact terminal, and a wireless power supply device may be used.

The detachable tray 40 configured as above may heat the air flowing in through the air flow path 26 and the ventilation grill 43 by the heater 61, and may supply the heated air to the sliding tray 50 in the second accommodation space 12 through the blowing fan 62 and the circulation grill 44. Accordingly, the warm air may dry moisture of the sliding tray and the stored items.

Also, the detachable tray 40 may include a switch 65 for turning the drying unit 60 on and off, and a light emitting unit 66 such as an LED device for checking the turning on and off of the drying unit.

Also, to easily mount the detachable tray 40 on the first accommodation space 11 or remove the detachable tray 40 from the first accommodation space 11, an upper plate 46 may be fastened to the upper surface of the detachable tray, and the handle 47 may be formed or mounted on the upper plate.

Accordingly, the console box for a vehicle in the sixth embodiment may implement a drying function for the items stored in the main body, thereby expanding functionality of the console box.

Figure 11:
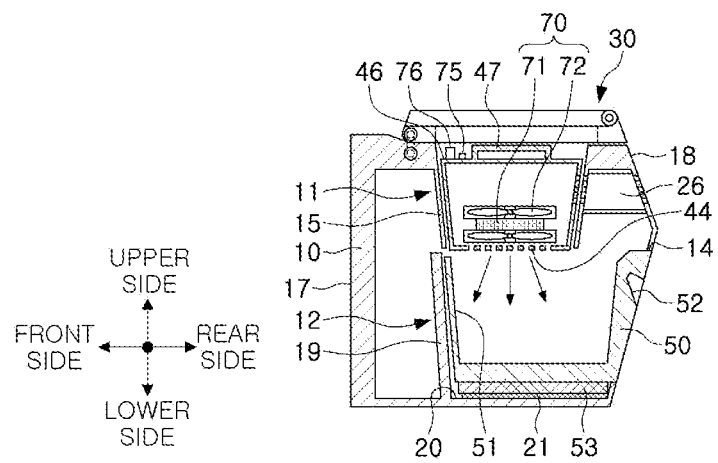
FIG. 11 is a cross-sectional diagram illustrating a console box for a vehicle according to a seventh embodiment of the present disclosure.

FIG. 11 is a cross-sectional diagram illustrating a console box for a vehicle according to a seventh embodiment.

Referring to FIG. 11, the console box for a vehicle in the seventh embodiment may include a main body 10, a cover 30, a detachable tray 40, a sliding tray 50, an air flow path 26 and a cooling and warming storage unit 70.

The configuration of the seventh embodiment illustrated in FIG. 11 in which the cooling and warming storage unit 70 is added may be different, and the other components may be the same as those of the fifth embodiment illustrated in FIG. 9. Accordingly, in describing the console box for a vehicle in the seventh embodiment, the same reference numerals may be given to the same components as those of the console box for a vehicle according to the fifth embodiment, and detailed descriptions of the configuration and functions will not be provided.

In the console box for a vehicle in the seventh embodiment, the cooling and warming storage unit 70 may be installed in the detachable tray 40. The cooling and warming storage unit may include a thermoelectric module 71 for absorbing heat from one side surface and emitting heat from the other side surface when power is supplied, and a pair of blowing fans 72 installed on both sides of the thermoelectric module and blowing the heat-exchanged air with the thermoelectric module.

The thermoelectric module 71 may include a Peltier element. Each blowing fan 72 may include a motor and may be driven by the motor. The power of the thermoelectric module and the blower fan may be applied while being electrically connected to the battery of the vehicle, and to this end, a cable, a connector having a contact terminal, and a wireless power supply device may be used.

When power is applied in the refrigeration mode, the side surface on the sliding tray 50 side of the thermoelectric module 71 may become a heat absorbing surface and the opposite side surface may become a heat emitting surface. The thermoelectric module may continuously emit heat by exchanging heat with air blown from the blowing fan 72 on the heat emitting surface side. Also, the thermoelectric module may continuously absorb heat by exchanging heat with air blown from the blowing fan 72 on the heat absorbing surface side.

Accordingly, since the side surface of the sliding tray 50 side of the thermoelectric module 71 may continuously act as a heat absorbing surface, the internal space of the sliding tray may be cooled such that a function of cooling the item contained therein may be performed.

Conversely, when power is applied in the warming mode, the side surface on the sliding tray 50 side of the thermoelectric module 71 may become a heat emitting surface and the opposite side may become a heat absorbing surface. The thermoelectric module may continuously absorb heat by exchanging heat with air blown from the blowing fan 72 on the heat absorbing surface. Also, the thermoelectric module may continuously emit heat by exchanging heat with air blown from the blowing fan 72 on the heat emitting surface side.

Accordingly, since the side surface of the sliding tray 50 side of the thermoelectric module 71 may continuously act as a heat emitting surface, the internal space of the sliding tray may be heated such that the function of warming the item contained therein may be performed.

The detachable tray 40 configured as described above may increase heating-emitting efficiency or heating-absorbing efficiency of the opposite side surface on the sliding tray 50 side of the thermoelectric module 71 by the air flowing in through the air flow path 26 and the ventilation grill 43, and cold air or warm air may be supplied to the sliding tray 50 in the second accommodation space 12 through the blowing fan 72 and the circulation grill 44 on the side surface on the sliding tray side of the thermoelectric module.

Accordingly, the function of cooling the sliding tray 50 and the stored items by the cold air, or the function of warming the sliding tray 50 and the stored items by the warm air may be performed.

Also, the detachable tray 40 may include a switch 75 for turning the cooling and warming storage unit 70 on and off and selecting a mode, and a light emitting unit 76, such as an LED device, for checking the turning on and off of the cooling and warming storage unit.

Also, to easily mount the detachable tray 40 on the first accommodation space 11 or remove the detachable tray 40 from the first accommodation space 11, the upper plate 46 may be fastened to the upper surface of the detachable tray, and the handle 47 may be formed or mounted on the upper plate.

The console box for a vehicle in the seventh embodiment may implement the function of cooling and warming the items stored in the main body, such that functionality of the console box may be expanded.

Figure 12:
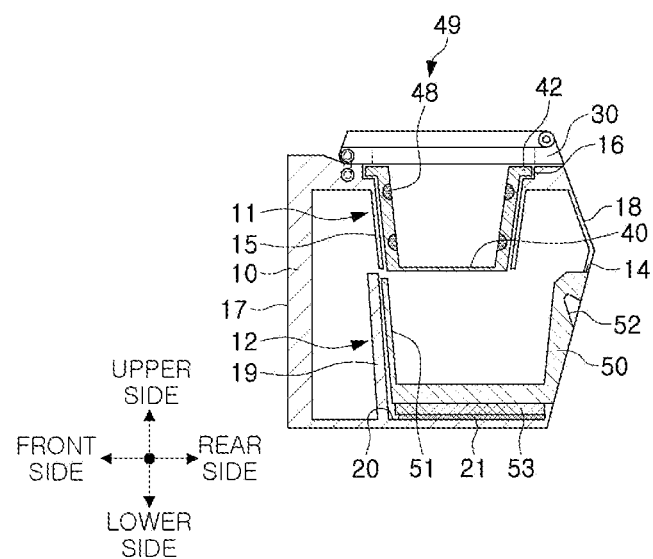
FIG. 12 is a cross-sectional diagram illustrating a console box for a vehicle according to an eighth embodiment of the present disclosure.

FIG. 12 is a cross-sectional diagram illustrating a console box for a vehicle according to an eighth embodiment.

Referring to FIG. 12, the console box for a vehicle in the eighth embodiment may include a main body 10, a cover 30, a detachable tray 40, a sliding tray 50 and a sterilization unit 49.

The configuration of the eighth embodiment illustrated in FIG. 12 in which a sterilization unit 49 is added, and the other components may be the same those of the first to fourth embodiments illustrated in FIGS. 1 to 8. Accordingly, in describing the console box for a vehicle in the eighth embodiment, the same reference numerals may be given to the same components as those of the console box for a vehicle according to the first to fourth embodiments described above and detailed descriptions of the configuration and functions will not be provided.

The console box for a vehicle in the eighth embodiment may further include a sterilization unit 49 mounted on the detachable tray 40 or the sliding tray 50 and sterilizing the stored items.

The sterilization unit 49 may include an ultraviolet lamp 48 for generating ultraviolet rays. The power of the ultraviolet lamp may be applied while being electrically connected to the battery of the vehicle, and to this end, a cable, a connector having a contact terminal, and a wireless power supply device may be used.

The example in which the ultraviolet lamp 48 is disposed on the detachable tray 40 is illustrated in FIG. 12, but the embodiment thereof is not limited thereto, and an ultraviolet lamp may also be disposed on the sliding tray 50. The ultraviolet lamp may be embedded in the side surface of the detachable tray or the sliding tray.

Optionally, the detachable tray 40 or the sliding tray 50 may include a switch for turning the sterilization unit 49 on and off, and a light emitting unit, such as an LED element, for checking the turning one and off of the sterilization unit.

For example, when the cover 30 or sliding tray 50 is opened, instead of a switch, the light emitting unit may be controlled to emit light, and when the cover or sliding tray is closed, the ultraviolet lamp 48 may be controlled to operate. Such control may be implemented through a control circuit including a sensor and a controller.

Ultraviolet rays may be irradiated into the detachable tray 40 or sliding tray 50 configured as above through the sterilization unit 49. Accordingly, bacteria attached to the stored item may be easily sterilized.

Accordingly, the console box for a vehicle in the eighth embodiment may implement a sterilization function for the items stored in the main body, thereby expanding functionality of the console box.

Figure 13A:
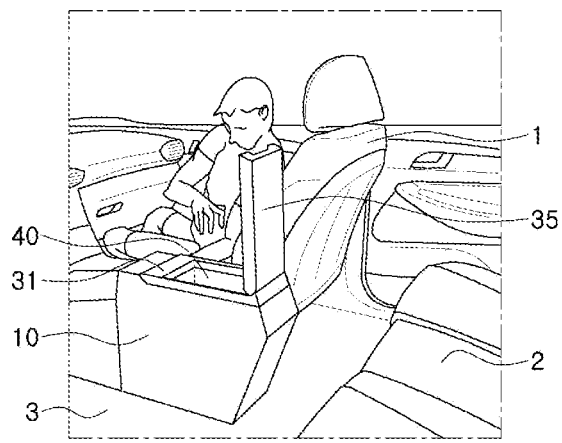
FIGS. 13A and 13B are diagrams illustrating a state in which a console box for a vehicle is used by a passenger of a first row seat according to an exemplary embodiment of the present disclosure.
Figure 13B:
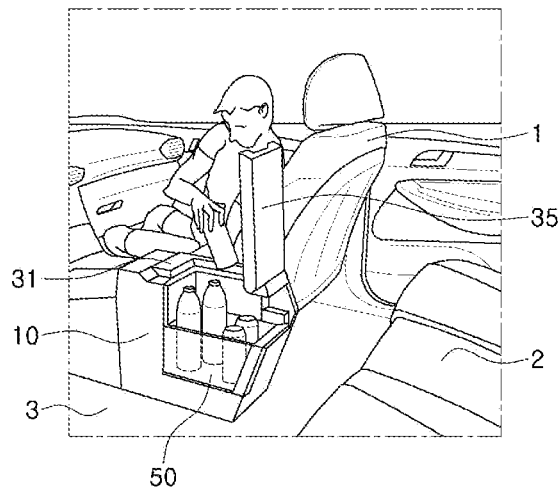

FIGS. 13A and 13B are diagrams illustrating a state in which a console box for a vehicle is used by a passenger of a first row seat according to an exemplary embodiment.

As in FIG. 13A, in order for the passenger of the first row seat 1 to access the first accommodation space 11 of the main body 10, the hood 35 of the cover 30 in the embodiment may be open. When the passenger lifts the other side of the hood by hand, the hood may rotate about the second hinge 36, thereby opening the hollow portion 33 of the frame 31 and the first opening 13 of the main body.

Therefore, the passenger of the first row seat 1 may conveniently access the first accommodation space 11 of the main body through the hollow portion 33 of the frame 31 and the first opening 13 of the main body 10, and may easily store an item in or take an item out from the detachable tray 40 accommodated in the first accommodation space.

The detachable tray 40 may be separated from the main body 10 to store an item having a height greater than that of the sliding tray 50 or the detachable tray 40.

As in FIG. 13B, when the passenger of the first row seat 1 opens the hood 35 of the cover 30 in the embodiment in a state in which the detachable tray is separated, the passenger may conveniently access the second accommodation space 12 of the main body through the hollow portion 33 of the frame 31 and the first opening 13 and the first accommodation space 11 of the main body 10, and may easily store an item in or take an item out from the sliding tray 50 accommodated in the second accommodation space.

Therefore, the passenger of the first row seat 1 may not need to store an item in or take out the item from the sliding tray 50 in an uncomfortable posture, such that the passenger conveniently access the first accommodation space 11 and the second accommodation space 12 of the main body 10.

Figure 14A:
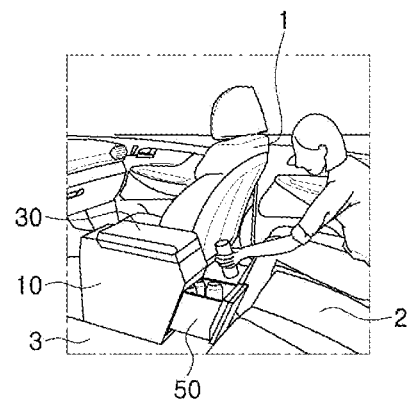
FIGS. 14A to 14C are diagrams illustrating a state in which a console box for a vehicle is used by a passenger of a second row seat according to an exemplary embodiment of the present disclosure.
Figure 14B:
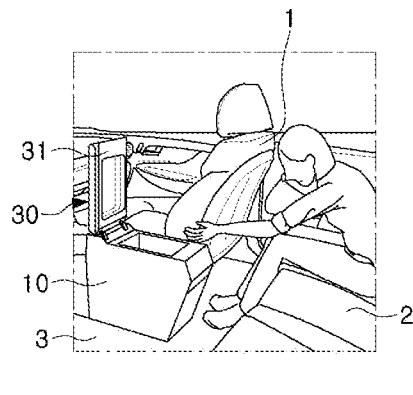
Figure 14C:
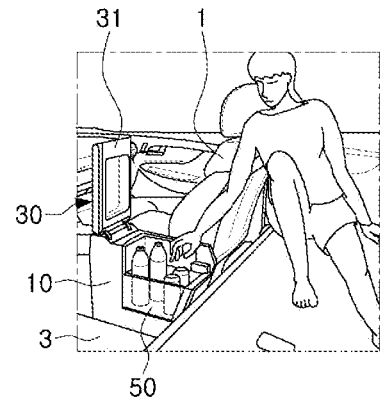

FIGS. 14A to 14C are diagrams illustrating a state in which a console box for a vehicle is used by a passenger of a second row seat according to an exemplary embodiment.

First, as in FIG. 14A, in order for the passenger of the second row seat 2 to access the second accommodation space 12 of the main body 10, the sliding tray 50 in the embodiment may be opened. As the passenger pulls the sliding tray by hand, the sliding tray may slide in the front-rear direction of the vehicle in the second accommodation space, and accordingly, the sliding tray may be moved out of the second accommodation space and may be opened.

Accordingly, the passenger of the second row seat 2 may conveniently access the sliding tray 50 and the second accommodation space 12 of the main body 10, and may easily store the item in or may be taken out the item from the sliding tray.

As in FIG. 14B, in order for the passenger of the second row seat 2 to access the first accommodation space 11 of the main body 10, the frame 31 of the cover 30 may be opened. As the passenger lifts the other side of the frame, that is, the second hinge 36 side of the hood 35 by hand, the frame may rotate about the first hinge 32 together with the hood. Accordingly, the first opening 13 of the main body may be opened.

Accordingly, the passenger of the second row seat 2 may conveniently access the first accommodation space 11 of the main body 10 through the first opening 13 of the main body 10 without taking an uncomfortable posture, and may easily store the item in or may be taken out the item from the detachable tray 40 accommodated in the first accommodation space.

As described above, the detachable tray may be separated from the main body 10 to store an item having a height greater than that of the sliding tray 50 or the detachable tray 40.

As in FIG. 14C, when the passenger of the second row seat 2 opens the frame 31 of the cover 30 in the embodiment in a state in which the detachable tray is separated, the passenger may conveniently access the second accommodation space 12 of the main body 10 through the first opening 13 and the first accommodation space 11 of the main body 10, and may easily store the item in or may be taken out the item from the sliding tray 50 accommodated in the second accommodation space.

Therefore, the passenger of the second row seat 2 may not need to store the item in or take out the item from the sliding tray 50 in an uncomfortable posture, such that the passenger may conveniently access the first accommodation space 11 and the second accommodation space 12 of the main body 10.

As described above, according to the embodiments, regardless of the seat row, passengers may access in various directions and may conveniently use all the built-in trays, and may also store items having a height greater than that of the tray, and therefore user convenience of the console box may increase.

Figure 15:
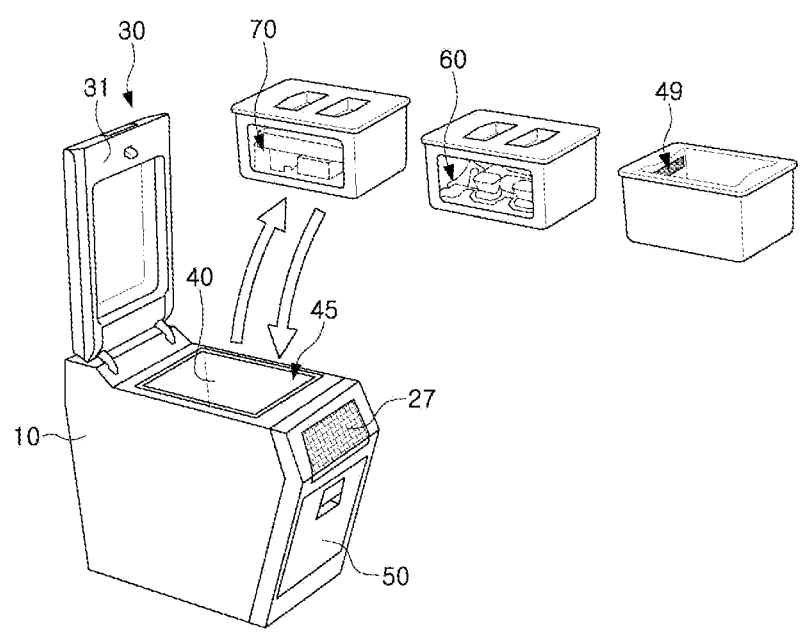
FIG. 15 is a diagram illustrating an example in which a functional detachable tray is used for a console box for a vehicle.

FIG. 15 is a diagram illustrating an example in which a functional detachable tray is used for a console box for a vehicle.

As illustrated in FIG. 15, the detachable tray 40 described in the first embodiment may be replaced with one of the functional trays to which the ventilation unit 45 of the fifth embodiment, the drying unit 60 of the sixth embodiment, the cooling and warming storage unit 70 of the seventh embodiment, and the sterilization unit 49 of the eighth embodiment are applied.

Therefore, in addition to the detachable tray 40 for storing items, various functional trays may be prepared, an appropriate tray may be mounted in the first accommodation space 11 of the main body 10 according to the needs or preferences of the passenger.

As described above, according to an exemplary embodiment, various functions may be added to and implemented in the detachable tray, functionality of the console box may be expanded and the product may be differentiated.

While the embodiments have been illustrated and described above, it will be apparent to those skilled in the art that modifications and variations could be manufactured without departing from the scope of the present disclosure as defined by the appended claims.

For example, the above and illustrated embodiments may be combined with each other, and each embodiment may optionally employ some components of other embodiments as needed.

What is claimed is:

1. A console box for a vehicle, comprising:
   a main body having a first accommodation space accessible through a first opening and a second accommodation space accessible through a second opening;
   a cover mounted on the main body and opening and closing the first opening;
   a detachable tray mounted on or detached from the first accommodation space through the first opening; and
   a sliding tray entering and exiting the second accommodation space through the second opening, opening and closing the second opening, and sliding in the second accommodation space,
   wherein the first accommodation space and the second accommodation space are communicated with each other in the main body, and
   wherein the console box further comprises a blocking member having a plate shape, connected to the sliding tray, interlocked with the movement of the sliding tray, and blocking a space between the first accommodation space and the second accommodation space in the main body.

2. The console box for a vehicle of claim 1, wherein the cover comprises:
   a frame rotatably installed around the first opening of the main body through a first hinge and having a hollow portion; and
   a hood mounted on the frame and opening and closing the hollow portion.

3. The console box for a vehicle of claim 2,
   wherein the hood is rotatably installed on the frame through a second hinge, and
   wherein the second hinge is disposed on an opposite side of the first hinge in the frame.

4. The console box for a vehicle of claim 2,
   wherein a guide groove is formed in the frame, and
   wherein a protrusion is formed in the hood and moves while being inserted into the guide groove of the frame, such that the hood slides around the hollow portion in the frame.

5. The console box for a vehicle of claim 1,
   wherein the first accommodation space and the second accommodation space are disposed in a vertical direction in the main body, and
   wherein the first opening is formed in an upper surface of the main body, and the second opening is formed in a lower rear surface of the main body.

6. The console box for a vehicle of claim 5,
   wherein the first accommodation space is formed by a plurality of upper sidewalls,
   wherein at least one of the upper sidewalls is inclined such that a distance from the other upper sidewall opposite thereto decreases downwardly, and
   wherein at least one of the side surfaces of the detachable tray is inclined to correspond to the inclined upper sidewall of the first accommodation space.

7. The console box for a vehicle of claim 6,
   wherein a stepped portion is formed on an upper end of the upper sidewall,
   wherein a locking groove extending outwardly is formed on an upper end of a side surface of the detachable tray, and
   wherein the locking groove is formed to shape-fit the stepped portion.

8. The console box for a vehicle of claim 5,
   wherein the second accommodation space is formed by a plurality of lower sidewalls and a bottom surface,
   wherein a rail member is installed on an internal surface of the second accommodation space, and
   wherein a slider or a rolling member is installed in the sliding tray and moves along the rail member.

9. The console box for a vehicle of claim 5,
   wherein a length of the sliding tray extending in a front-rear direction of the vehicle is at least twice greater than a length of a lower cross-section of the first accommodation space extending in a front-rear direction of the vehicle.

10. The console box for a vehicle of claim 1,
    wherein the blocking member is movable into a space between a lower sidewall forming the second accommodation space and an external wall of the main body, and
    wherein an insertion groove is formed in a sidewall of the main body, supports the blocking member and induces a movement thereof.

11. A console box for a vehicle, comprising:
    a main body having a first accommodation space accessible through a first opening and a second accommodation space accessible through a second opening;
    a cover mounted on the main body and opening and closing the first opening;
    a detachable tray mounted on or detached from the first accommodation space through the first opening;
    an air flow path formed between an external wall of the main body and an upper sidewall forming the first accommodation space and supplying external air to the first accommodation space; and
    a sliding tray entering and exiting the second accommodation space through the second opening, opening and closing the second opening, and sliding in the second accommodation space,
    wherein the first accommodation space and the second accommodation space are communicated with each other in the main body.

12. The console box for a vehicle of claim 11, wherein the air flow path comprises:
    a first grill formed on an external wall of the main body;
    a second grill formed on an upper sidewall of the first accommodation space; and
    a duct connecting the first grill to the second grill.

13. The console box for a vehicle of claim 12, wherein the detachable tray is replaceable with one of a tray to which a ventilation unit is applied, a tray to which a drying unit is applied, and a tray to which a cooling and warming storage unit is applied.

14. The console box for a vehicle of claim 13, wherein the tray to which a ventilation unit is applied comprises:
    a ventilation grill formed to correspond to the second grill on at least one of side surfaces of the tray; and
    a circulation grill formed on at least a portion of a bottom surface of the tray.

15. The console box for a vehicle of claim 14, wherein the tray to which a drying unit is applied comprises:
    a ventilation grill formed to correspond to the second grill on at least one of side surfaces of the tray; and
    a circulation grill formed on at least a portion of a bottom surface of the tray, and
    wherein the drying unit comprises:
    a heater for heating air flowing into the tray, and a blowing fan for blowing the heated air through the circulation grill.

16. The console box for a vehicle of claim 14, wherein the cooling and warming storage unit comprises:
- a thermoelectric module for absorbing heat on one side surface and emitting heat on the other side surface when power is supplied; and
- a pair of blowing fans installed on both sides of the thermoelectric module and blowing air heat-exchanged with the thermoelectric module.

17. The console box for a vehicle of claim 1, wherein the detachable tray or the sliding tray comprises an ultraviolet lamp generating ultraviolet rays.

18. A vehicle comprising the console box of claim 1.

* * * * *